United States Patent [19]
Ibenthal

[11] Patent Number: 5,771,074
[45] Date of Patent: Jun. 23, 1998

[54] METHOD OF INTERFRAME INTERPOLATION OF COLOR DIFFERENCE SIGNALS, AND CIRCUIT ARRANGEMENT FOR PERFORMING SAID METHOD

[75] Inventor: Achim Ibenthal, Elmshorn, Germany

[73] Assignee: U.S. Philips Corporation, New York, N.Y.

[21] Appl. No.: 700,703

[22] Filed: Jul. 10, 1996

[30] Foreign Application Priority Data

Jul. 13, 1995 [DE] Germany .................. 195 25 531.3

[51] Int. Cl.$^6$ ............................................... H04N 7/01
[52] U.S. Cl. ...................... 348/444; 348/624; 348/454
[58] Field of Search ......................... 348/444, 453–456, 348/577, 621, 624, 630, 631, 582

[56] References Cited

U.S. PATENT DOCUMENTS

| | | | |
|---|---|---|---|
| 4,335,395 | 6/1982 | Clarke | 348/444 |
| 4,667,222 | 5/1987 | McCoy | 348/582 |
| 5,159,437 | 10/1992 | Lee | 348/444 |
| 5,221,966 | 6/1993 | Clayton et al. | 348/444 |

FOREIGN PATENT DOCUMENTS

| | | |
|---|---|---|
| 0475499A1 | 3/1992 | Germany . |
| 4031921A1 | 4/1992 | Germany . |

*Primary Examiner*—Victor R. Kostak
*Attorney, Agent, or Firm*—Edward W. Goodman

[57] ABSTRACT

To avoid color defects in the motion-compensated luminance signal, which defects occur in non-motion-compensative time-interpolation of the color signal, a method includes the steps of generating a second color difference signal from a first color difference signal supplied at a first field repetition frequency by way of field repetition, the second color difference signal having a second field repetition frequency which is doubled with respect to the first field repetition frequency, generating a third, time-averaged color difference signal from the second color difference signal by time-averaging of two consecutive fields, generating a fourth, spatially high-resolution color difference signal by a spatially high-resolution interpolation of two consecutive fields from the second color difference signal, forming a fifth color difference signal to be supplied as a linear combination of the third and the fourth color difference signals by means of coefficients which are complementary with respect to a constant, and determining, in accordance with a vertical spatial frequency, which can be derived from picture contents representable by the color difference signals, or in accordance with a local rate of motion, the coefficients in such a way that substantially the third color difference signal, and in the reverse case substantially the fourth color difference signal, are used for forming the fifth color difference signal in the linear combination in the case of rapid motion or low spatial frequencies.

14 Claims, 9 Drawing Sheets

|   |     |     |     |     |     |     |
|---|-----|-----|-----|-----|-----|-----|
| a) | TA  | TB  |     | TC  |     | TD  |
| b) | TA  | TA  | TB  | TB  | TC  | TC  |
| c) | TZ  | TZ  | TA  | TA  | TB  | TB  |
| d) | TZ* | TZA | TA  | TAB | TB* | TBC |
| e) | 3   | 4   | 1   | 2   | 3   | 4   |

FIG. 4

| T No. | $Z_{mod4}$ | WEN | MO | C1 |
|-------|------------|-----|----|----|
| 1 | 1 | 0 | 0 | 0 |
|   | 2 | 1 | 0 | 4 |
|   | 3 | 1 | 0 | 8 |
|   | 0 | 1 | 1 | 4 |
| 2 | 1 | 1 | 1 | 6 |
|   | 2 | 1 | 1 | 2 |
|   | 3 | 0 | 0 | 2 |
|   | 0 | 1 | 0 | 6 |
| 3 | 1 | 1 | 0 | 8 |
|   | 2 | 1 | 1 | 4 |
|   | 3 | 0 | 0 | 0 |
|   | 0 | 1 | 0 | 4 |
| 4 | 1 | 0 | 0 | 2 |
|   | 2 | 1 | 0 | 6 |
|   | 3 | 1 | 1 | 6 |
|   | 0 | 1 | 1 | 2 |

| T No. | WEN | MO | C1 |
|---|---|---|---|
| 1 | 1 | 1 | 0 |
| 2 | 1 | 1 | 8 |
| 3 | 1 | 0 | 8 |
| 4 | 1 | 0 | 0 |

FIG. 11

| T No. | KMUX |
|---|---|
| 1 | 1 |
| 2 | 0 |
| 3 | 1 |
| 4 | 0 |

METHOD OF INTERFRAME INTERPOLATION OF COLOR DIFFERENCE SIGNALS, AND CIRCUIT ARRANGEMENT FOR PERFORMING SAID METHOD

BACKGROUND OF THE INVENTION

1. Field of the Invention

The invention relates to a method of interpolating interlaced color difference signals. The invention also relates to a circuit arrangement for performing such a method.

2. Description of the Related Art

For the vertical format conversion, for example, as zoom effect, and, optionally or additionally, for the vertical up-conversion of the time scanning rate of television pictures, interpolation filters are required which do not visibly reduce the viewer's subjective impression of sharpness as compared with the original picture. If, for example, the frame frequency is to be doubled, standard interpolation methods used for moving picture contents have proved to be inadequate. For example, German Offenlegungsschrift P 40 31 921, corresponding to U.S. Pat. No. 5,153,719, or European Patent Application 0 475 499 describes a motion-compensative interpolation, particularly for the luminance signal of television pictures. This should ensure the impression of sharpness, also of moving pictures. These methods concentrate on the luminance signal, because the human eye is not so sensitive to loss of sharpness of the color information, so that particularly for reasons of reducing the number of components for the color information, a simpler form of interpolation has come to be preferred.

Figure 1A:
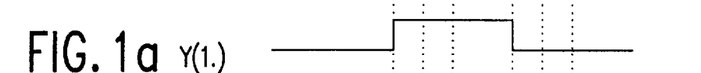
FIGS. 1a–1g and 2a–2g, already described, elucidate the drawbacks in the state of the art and the mode of operation of the invention.
Figure 1B:
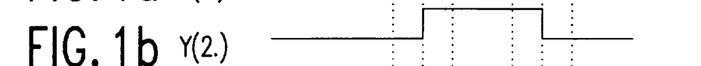
Figure 1C:
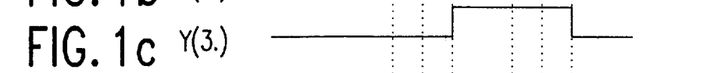

A preferred interpolation method for color difference signals in television pictures principally consists of repeating fields, i.e., each field received at a low scanning rate and a low field repetition frequency is represented in twofold (or multifold) at, for example, the double scanning rate and field repetition frequency. For the case where also the luminance signals are displayed with the same field repetition, motion artefacts are obtained in the display of the television pictures, but no color defects because the spatial association between the luminance signal and the chrominance signal is or remains identical, also in the case of object motions within the picture contents. In contrast, however, when using motion compensation for the luminance signal, it may not be excluded that the luminance information relative to the chrominance information appears to be shifted. An example of such an erroneous picture display is shown diagrammatically in FIGS. 1a–1g. In FIGS. 1a and 1c the fields have a simplified, exemplary signal variation for the luminance signal at a select position in a first field or in the subsequently transmitted field. The shift of the rectangular variation indicates an object motion in the picture from one to the next field. In contrast, FIG. 1b) shows the luminance signal Y for a (second) field which is produced from the (first) field shown in FIG. 1a) and the (third) field shown in FIG. 1c) by doubling of the field repetition frequency, while, simultaneously a motion compensation is performed in the luminance signal Y. The associated signal variations for example of a chrominance signal associated with the luminance signal are shown in FIG. 2d shows, by way of example, the associated chrominance signal C for the first field with an achromatic signal value in the range of low signal values for the luminance signal Y in accordance with FIG. 1a), and for a red signal value in the range of higher values of the luminance signal Y, denoted by U and R in FIG. 2d. The same is shown in FIG. 1f) for the third field, which shows that for these fields the sections having a high luminance signal value Y are congruent with the sections of the red signal value for the chrominance signal C. Thus, no errors are produced when the first and the third field are displayed.

Figure 1D:
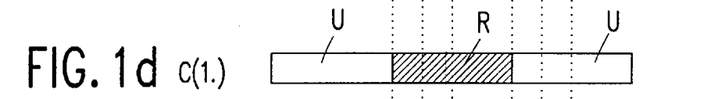
Figure 1E:
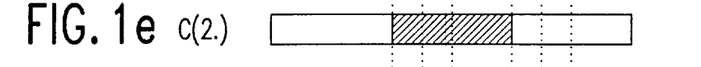
Figure 1F:
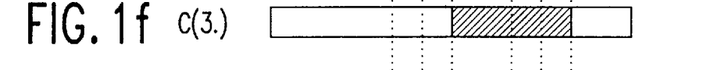
Figure 1G:
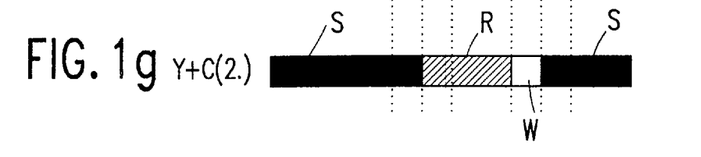
Figure 2A:
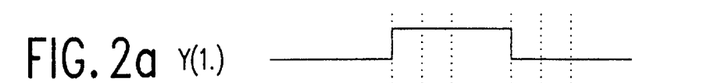
Figure 2B:
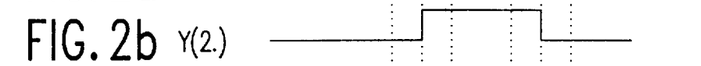
Figure 2C:
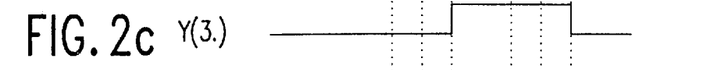
Figure 2D:
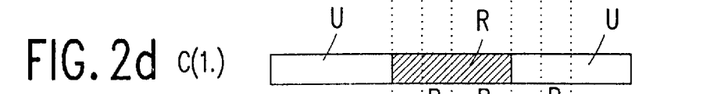

The chrominance signal C for the second, interpolated field in accordance with FIG. 1e) is constituted by a simple field repetition and thus corresponds to the chrominance signal in accordance with FIG. 1d) for the first field. A comparison with FIG. 1b) shows that luminance signal Y and chrominance signal C are now no longer congruent. FIG. 1g) shows the picture impression for the second, interpolated field. In this Figure, black picture portions, red picture portions and white picture portions are denoted by S, R and W, respectively. The Figure shows that a white picture impression is obtained in the picture areas in which a high luminance signal Y but no chrominance signal C occurs. In the time-interpolated interframe, i.e., the second field in accordance with FIGS. 1b and 1e, the edge, in the motion direction, of an object shown in the picture acquires the background color rather than the object color in a width proportional to the displacement of the object, which leads to a very disturbing picture impression.

SUMMARY OF THE INVENTION

It is an object of the invention to provide a method of interpolating color difference signals, and to provide a circuit arrangement for performing this method, in which the described errors in the chrominance signal in the case of motion-compensated luminance signals are obviated without any loss of sharpness.

According to the invention, this object is solved by means of a method of the type described in the opening paragraph which is characterized by the steps of:

generating a second color difference signal from a first color difference signal, supplied at a first field repetition frequency, by way of field repetition, the second color difference signal having a second field repetition frequency which is doubled with respect to the first field repetition frequency, generating a third, time-averaged color difference signal from the second color difference signal by time-averaging of two consecutive fields, generating a fourth, spatially high-resolution color difference signal by a spatially high-resolution interpolation of two consecutive fields from the second color difference signal, forming a fifth color difference signal to be supplied as a linear combination of the third and the fourth color difference signals by means of coefficients which are complementary with respect to a constant, and determining, in accordance with a vertical spatial frequency, which can be derived from picture contents representable by the color difference signals, or in accordance with a local rate of motion, the coefficients in such a way that substantially the third color difference signal, and, in the reverse case, substantially the fourth color difference signal, are used for forming the fifth color difference signal in the linear combination in the case of rapid motion or low spatial frequencies.

Figure 2E:
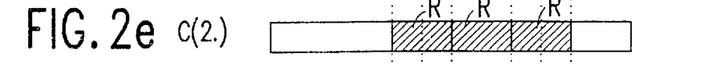
Figure 2F:
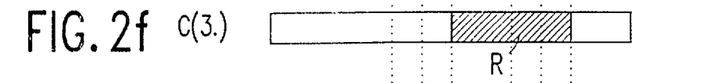
Figure 2G:
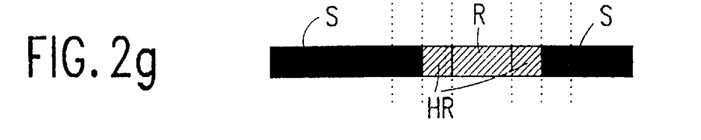

The color distortion in moving object edges in the picture can be remedied by time-averaging of two fields. FIGS. 2a—2g show this diagrammatically, in which the reference signs and symbols correspond to those in FIGS. 2a–2g. The luminance signal Y, in accordance with FIGS. 2a to 2c corresponds to the motion-compensated luminance signal in accordance with FIGS. 1a to 1c. On the other hand, the chrominance signal C of the second field in accordance with FIG. 2e) is formed by averaging the chrominance signals C of the previous first field in accordance with FIG. 2d) and the subsequent third field in accordance with FIG. 2f). As a result of the addition of the chrominance signals performed during this averaging operation—in the example shown in FIGS. 2a–2g red R and achromatic U—a desaturated red is assigned to newly uncovered areas of the achromatic background as well as to areas covered by the moving object in the picture, which is shown in FIG. 2e) in the front and rear signal section denoted by red R. Consequently, the geometric center of gravity of the object color in the interpolated interframe (second field) is analogous to the motion-compensated luminance and the color defects are reduced from white W in accordance with FIG. 1g) to a desaturated red. This is shown as bright red HR in FIG. 2g) as a picture impression of the second field in the corresponding signal sections or picture areas. In a case in which also the background has a color (and not only achromatic as in FIGS. 1a–1g and 2a–2g), a mixed color which is desaturated, particularly in the case of complementary colors, results from mixing.

While assuming a motion compensation of the luminance signals by time-averaging of the chrominance signals in accordance with FIGS. 2a–2g, it is possible to achieve a better color display of moving picture contents than is achieved by field repetition as in FIGS. 1a–1g. Based on the line interlace in the transmission and display of picture signals, the averaging between successive fields leads to a vertical-temporal low-pass filtering, so that the vertical frequency response is cosinusoidally damped. This is clearly visible, particularly at static, horizontal color edges. However, the invention describes a method (including several variants) which provides the possibility of improved color display by an adaptive reversal of the chrominance signal interpolation. In the invention, a method of vertical interpolation of intermediate lines (zoom) is also taken into account. The invention thus avoids color defects with the motion-compensated luminance signal, which defects occur in the non-motion-compensative time-interpolation of the chrominance signal.

The invention further provides a circuit arrangement for performing the method described hereinbefore, which circuit arrangement comprises the following parts:

a first field memory having an input for applying the first color difference signal and an output for supplying the second color difference signal, a second field memory having an input which is connected to the output of the first field memory, and an output for supplying the second color difference signal which is delayed by one field period, a line memory having an input which is connected to the output of the second field memory, and an output which can supply a second color difference signal which is delayed by an extra line period, a first interpolation circuit having three inputs which are connected to the outputs of the first field memory, the second field memory and the line memory, respectively, and an output for supplying the third color difference signal, a second interpolation circuit having three inputs which are connected to the outputs of the second field memory, the first field memory and the line memory, respectively, and an output for supplying the fourth color difference signal, a first mixer stage having a first input which is connected to the output of the first interpolation circuit, and a second input which is connected to the output of the second interpolation circuit, and an output which can supply the fifth color difference signal, a first control stage for controlling the first mixer stage by determining the coefficient for forming the fifth color difference signal and for supplying a corresponding coefficient signal.

In the circuit arrangement according to the invention, the first field memory is thus used for converting the field repetition frequency, whereas the second field memory is used for supplying a color difference signal (here the second color difference signal) delayed by one field. In a corresponding manner, the line memory is used for the delay by an additional line period. Instead of said memories, functionally equivalent delay circuits may alternatively be used. Moreover, an additional delay may be introduced, by which delay differences in the signal processing of the luminance signal, on the one hand, and the chrominance signal, on the other hand, can be compensated.

A switch between a vertical spatial high-resolution and time-averaging is performed in the picture contents by means of the method according to the invention and the circuit arrangement according to the invention for performing this method, either dependent on the vertical spatial frequency of the color difference signals, or dependent on the local rate of motion. The two field memories then supply two time-adjacent fields. The color difference signals to be processed may be available as time-sequentially interleaved signals or in parallel. The first interpolation circuit is used for time-averaging of two consecutive fields of the second color difference signal and generates the third time-averaged color difference signal. At this averaging operation of the individual lines of the consecutive fields, the signals of the two fields contribute 50% each to the third color difference signal. The second interpolation circuit is used for vertical spatially high-resolution interpolation of intermediate lines. The fourth, spatially high-resolution color difference signal is generated from two consecutive fields of the second color difference signal.

In an advantageous embodiment of the method according to the invention and the circuit arrangement for performing this method, there is a pixel-by-pixel superimposition of the second color difference signal of two or three picture lines of two consecutive fields, which lines are locally adjacent in the representation of the picture, at the same weighting for each field, to form the third color difference signal. To this end, the first interpolation circuit preferably comprises a first multiplier stage for multiplying a signal applied to its input by a factor of 0.5 and making said signal available at the output of the first interpolation circuit, a first adder stage having an output which is connected to the input of the first multiplier stage, and a first input which constitutes the first input of the first interpolation circuit, and a second input to which the second color difference signal from the second or the third input of the first interpolation circuit, or a mean value of said two signals, can be applied.

Particularly, the mean value of the values of the second color difference signal of the second and the third input of the first interpolation circuit can be generated by a second adder stage and a second multiplier stage by which said values are first additively superimposed and then their sums are multiplied by the factor of 0.5.

In a further embodiment of the method according to the invention and the circuit arrangement for performing this method, there is a pixel-by-pixel median filtering of the second color difference signal of three picture lines of two consecutive fields, which lines are locally adjacent in the representation of the picture, to form the fourth color difference signal. To this end, the second interpolation circuit particularly comprises a median filter having inputs constituted by the inputs of the second interpolation circuit and being adapted to supply, from its outputs, the central signal value of the three signal values currently applied to its inputs, a first switching stage for optionally switching the second color difference signal from the output of the line memory or from the output of the second field memory to an output of the first switching stage, a second mixer stage having a first input which is connected to the output of the median filter, and a second input which is connected to the output of the first switching stage, and an output from which the fourth color difference signal can be supplied, and a second control stage for controlling the second mixer stage by determining the coefficients for forming the fourth color difference signal.

The second interpolation circuit is used for vertical spatially high-resolution interpolation of interlaced lines. In the preferred embodiment, a median filtering is used for this purpose. Here, the median filter principally has the advantage that it automatically changes to a mode of operation corresponding to field repetition in the case of moving picture contents, so that larger artefacts are avoided.

A further embodiment of the spatially high-resolution interpolation of the method according to the invention is characterized in that a signal, which is obtained from the median filtering operation for gaining the fourth color difference signal, is linearly combined with the signal of optionally one of the two picture lines taken from the same field, while the weighting in said linear combination is determined by a picture format factor in dependence upon the picture lines and the fields, in accordance with which factor, a vertical format conversion between the pictures representing the first and the fourth color difference signal is to be performed.

With this embodiment of the method according to the invention, not only a doubling of the field repetition frequency but also a change of the picture format, particularly a larger picture or a blow-up of a picture section (zoom), can be realized. In the case of a picture format change, the lines of the picture representing the fifth color difference signal will be situated at an arbitrary vertical position between the lines of the fields of the second color difference signal, dependent on the vertical picture format factor (hereinafter referred to as zoom factor). In conformity with the zoom factor, a vertical control sequence is determined for representing the format-converted picture. In this control sequence, that line of the second field used for the interpolation is defined which is most proximate to the line to be interpolated, and a weighting factor C1 is fixed for the central line B' which results from the median filtering. For forming the fourth color difference signal, a linear weighting in conformity with the formula $E=C1·B'+(1-C1)·DIR$ is performed, in which E is the signal value of the fourth color difference signal and DIR is the signal value of the line from the second field which is most proximate to the line to be interpolated. The weighting factor C1 is scaled at 1. In accordance with the relation defined above, an exact geometrical interpolation thus takes place. The two picture lines taken from the same field are the two outer lines of the three spatially adjacent picture lines of two consecutive fields in the representation of the picture.

In a further embodiment of the spatially high-resolution interpolation, the signal obtained from the median filtering operation, or, optionally if the two fields originate from the same motion phase, the signal of the central picture line of the three picture lines which are locally adjacent in the representation of the picture, is used for gaining the fourth color difference signal. This embodiment is preferably used for television signals having a number of motion phases per unit of time which is half with respect to the first field repetition frequency. Such television signals are produced, for example, when scanning cinematographic films. If it is known that the two fields of a frame in an interlaced scanning mode originate from the same motion phase, the signal of the spatially central picture line can be switched directly without any median filtering.

A corresponding embodiment of the circuit arrangement for performing the method according to the invention is characterized by a second switching stage controlled by the second control stage for optionally switching the second color difference signal from the output of the first field memory, or the signal from the output of the median filter, to the first input of the second mixer stage.

In a first variant, the method according to the invention is characterized in that, for estimating the vertical spatial frequency, the absolute value of two adjacent picture lines of a field is determined pixel by pixel, and in that the values of the coefficients, which are used for forming the fifth color difference signal from the third and the fourth color difference signal, are fixed from this absolute value via a predeterminable first assignment function. This method may be preferably performed with a circuit arrangement which comprises:

a first subtracter stage having a subtrahend input which is connected to the input of the line memory, a minuend input which is connected to the output of the line memory, and a difference output, a value-forming stage which is connected to the difference output of the first subtracter stage for making the value of the signal available at the difference output of the first subtracter stage, and a first characteristic-curve stage for generating the coefficient signal from said value in accordance with the first assignment function.

In a further embodiment of the method according to the invention, the values of the coefficients, which are used for forming the fifth color difference signal from the third and the fourth color difference signal, are fixed from the local rate of motion via a predeterminable second assignment function. In a circuit arrangement which is particularly suitable for performing this method, the first control stage comprises a third adder stage for combining a signal by the value of a horizontal, local object motion with a signal by the value of a vertical, local object motion, and a second characteristic-curve stage for generating the coefficient signal from said value in accordance with the second assignment function.

In these two variants of the method according to the invention and the circuit arrangement according to the invention, a switch or linear superimposition, determined by the picture contents, of the third and the fourth color difference signal to the fifth color difference signal takes place, in which different criteria are used for dimensioning the switch and the mixing factor for the linear superimposition (linear combination) of the third and the fourth color difference signal. The estimation of the vertical spatial frequency is realized by determining the absolute value of the difference between two adjacent picture lines of a field which are available at the input and the output of the line memory. With these absolute values, the first characteristic-curve stage is addressed which may be implemented, for example as a read-only memory (ROM) and from which predeterminable values of a mixing factor MIX are applied to the first mixer stage. The mixing factor preferably assumes a value within a range between MIX=1 corresponding to a low vertical spatial frequency, only taking into account the time-averaged color difference signal, on the one hand, and MIX=0 corresponding to a high vertical spatial frequency, and thus only taking into account the spatially high-resolution interpolated color difference signal from the interpolation circuit 2, on the other hand. The switch or linear combination is preferably realized in accordance with the formula UV100=MIX·D+(1−MIX)·E, in which UV100 is the signal value of the fifth color difference signal and D is the signal value of the third color difference signal. The signal value UV100 of the fifth color difference signal thus results from a time-averaging operation for motion-compensated luminance signals and low spatial frequencies, whereas at high vertical spatial frequencies a blur of horizontal edges is evaded. In both cases, interpolation methods are used which result in an optimum, noticeable picture quality. A first assignment function having a constant, "smooth" variation for preventing visible switching cycles may then be preferred.

In the previously described second variant of the method according to the invention, the fact is utilized that, with the availability of a motion-compensated luminance signal, signals describing the local object motion are also available. These signals are preferably available in such a form that a first of these signals, VX, represents the value of the horizontal object motion and a second signal, VY, represents the value of the vertical object motion. These signals may be evaluated in different ways. For example, a control value gained from these signals may be constituted by the maximum value of these two signals, but the sum of the values or the sum of the square values of the horizontal and vertical object motions may be used as a control value. In a preferred embodiment of the circuit arrangement for performing the method according to the invention the sum of the values is formed as a control value in the third adder stage. The control value thus gained addresses the second characteristic-curve stage in which the value for the coefficient signal constituting the mixing factor MIX is generated via the second assignment function. Generally, this second assignment function may be dependent on the choice of the control value. For the above-mentioned control values, a switch mainly for time averaging is used for large values and a switch for vertical spatially high-resolution interpolation is used for small values of the control value.

In those fields of the fifth color difference signal in which there is no time-interframe interpolation, the color difference signal may be formed in accordance with the method described above. However, no time-averaged part should then occur in the fifth color difference signal. To avoid a possibly detrimental influence of time-averaging on the signal, this time-averaging may be switched off during said fields. To this end, a circuit arrangement for performing this method preferably comprises a third switching stage for optionally supplying the coefficient signal from the first control stage, or for switching the first mixer stage to an operating state in which the fifth color difference signal corresponds to the fourth color difference signal. The coefficient signal, i.e. the mixing factor MIX, is then only effective in the interpolated fields of the fifth color difference signal.

These and other aspects of the invention will be apparent from and elucidated with reference to the embodiments described hereinafter

BRIEF DESCRIPTION OF THE DRAWINGS

In the drawings.

Corresponding elements in the Figures are denoted by the same reference signs.

DESCRIPTION OF THE PREFERRED EMBODIMENTS

Figure 3:
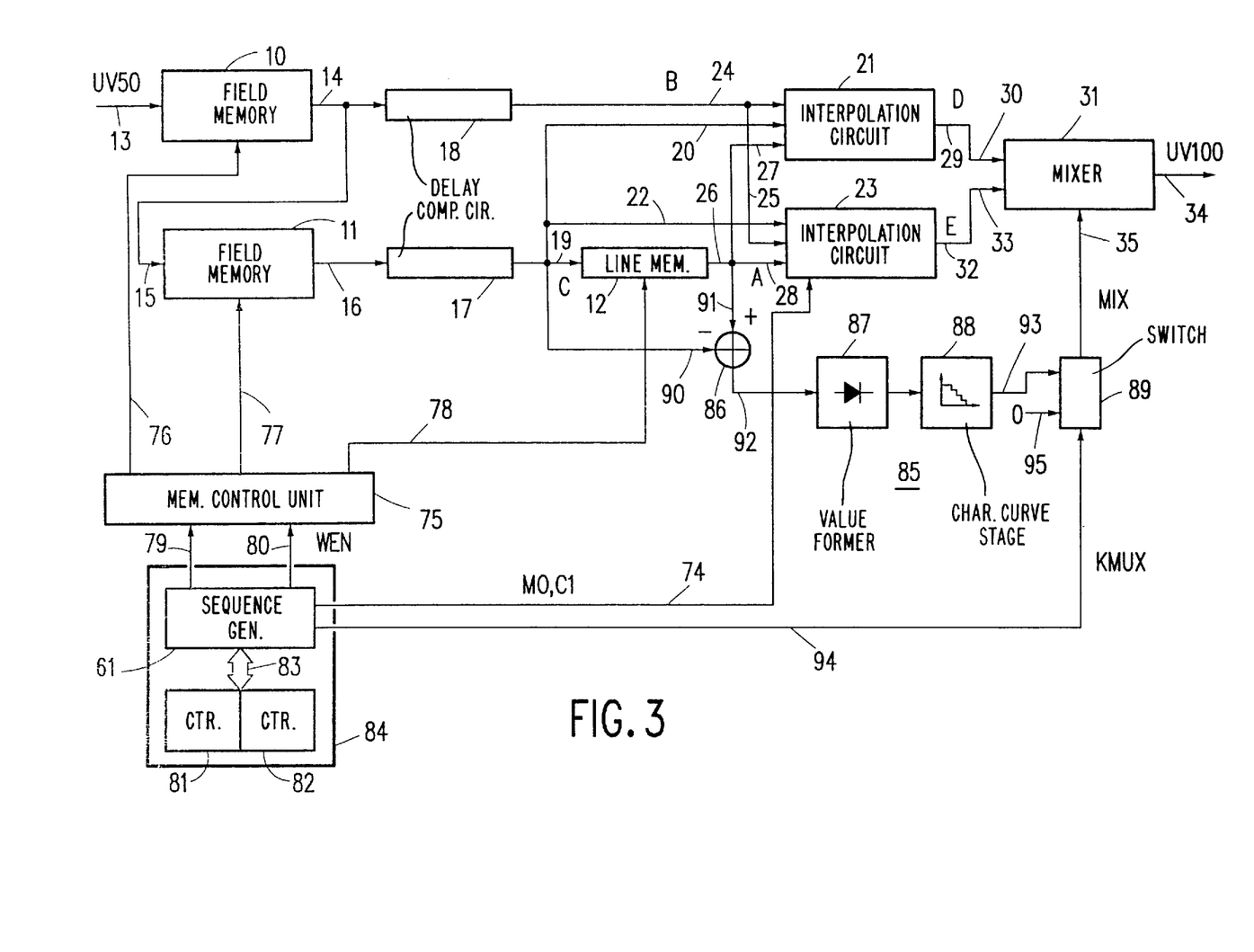
FIG. 3 is a block diagram of an embodiment of a circuit arrangement for performing a first variant of the method according to the invention.

FIG. 3 shows a circuit arrangement for performing the variant of the method according to the invention, which, dependent on the vertical spatial frequency of the color difference signals, realizes a switch (or mix or linear combination) between vertical spatially high-resolution and time-averaging. This circuit arrangement comprises a first field memory 10, a second field memory 11 and a line memory 12. The first field memory 10 has an input 13 for receiving the first color difference signal UV50 and an output 14 for supplying the second color difference signal. The output 14 of the first field memory 10 is connected to an input 15 of the second field memory 11. An output 16 of the second field memory 11 is adapted to supply the second color difference signal which is delayed by the period of one field of the first color difference signal UV50, and is connected to an input 19 of the line memory 12 via a first delay compensation circuit 17. A second input 20 of a first interpolation circuit 21 and a first input 22 of a second interpolation circuit 23 are connected to the input 19. In a corresponding manner, the output 14 of the first field memory 10 is connected via a second delay compensation circuit 18 to a first input 24 of the first interpolation circuit 21 and to a second input 25 of the second interpolation circuit 23. An output 26 of the line memory 12 is connected to a third input 27 and 28 of the first and the second interpolation circuit 21 and 23, respectively.

The line memory 12 supplies at its output 26 a second color difference signal which is delayed by one line period, additionally, to the second color difference signal at its input 19. The delay compensation circuits 17, 18 have the same delay period and are used for delay compensation between the color difference signals and the luminance signal and may be arranged before the input 13 of the first field memory 10, but then only one circuit, in the circuit arrangement described. Since they delay the second color difference signal in the same way, they may be left out of consideration in the following description.

An output 29 of the first interpolation circuit 21 is used for supplying the third, time-averaged color difference signal and is connected to a first input 30 of a first mixer stage 31. An output 32 of the second interpolation circuit 23 is used for supplying the fourth, spatially high-resolution color difference signal and is connected to a second input 33 of the first mixer stage 31. An output 34 of the first mixer stage 31 is used for supplying the fifth color difference signal UV100. In FIG. 3, the reference B denotes the second color difference signal at the output 14 of the first field memory 10 (or at the output of the second delay compensation circuit 18), and the reference C denotes the second color difference signal (or its signal values) delayed by the period of one field of the first color difference signal UV50. In a corresponding manner, D denotes the third color difference signal at the output 29 of the first interpolation circuit 21, and E denotes the fourth color difference signal at the output 32 of the second interpolation circuit 23. In the picture, the lines of the second color difference signals B and C shown at a specific point of time and the line of the second color difference signal additionally delayed by one line period with respect to the second color difference signal C and denoted by A are arranged spatially adjacent. If, in a modification of the embodiment of FIG. 3, the second field memory 11 has a second output for a correspondingly time-delayed second color difference signal, the line memory 12 may be omitted, provided that the field memory 11 is at least line-addressable, because the same line may be read twice (in case of zoom).

In the first interpolation circuit 21, the time-averaged third color difference signal D is formed from the three spatially adjacent lines of the color difference signal, A, B, C. When averaging the lines A, B, C, half of the signals from the two fields are used or taken into account for the output signal D, i.e., the third color difference signal. The same lines, A, B, C, in which in both cases A is the upper frame line, B is the central frame line and C is the lower frame line of the combination of two fields to a frame in the interlaced scanning mode, are also applied via the inputs 22, 25, 28 to the second interpolation circuit 23 which forms therefrom the fourth, spatially high-resolution color difference signal E. The first mixer stage 31 forms, from the signals D and E, and dependent on a coefficient signal or mixing factor MIX applicable via a coefficient signal input 35, the fifth color difference signal UV100 in the form of a fade-out and fade-in between the third color difference signal D and the fourth color difference signal E corresponding to the value of the mixing factor MIX.

Figure 4:
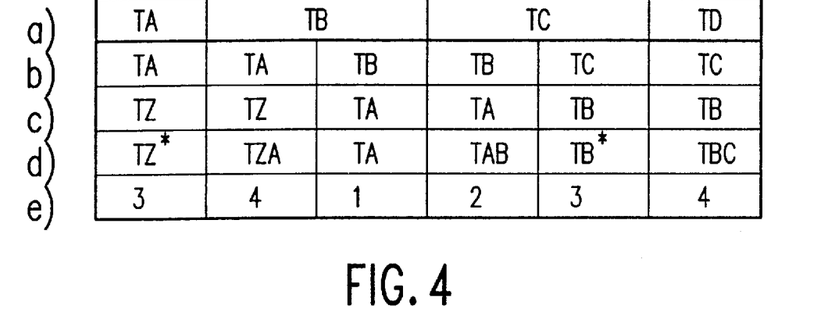
FIG. 4 shows an assignment table from which the sequence of fields in an example of an embodiment according to the invention can be seen.

The Table in FIG. 4 shows the time sequence of the frames or fields to be processed, by way of an example, in which the first color difference signal UV50 having a field repetition frequency of, for example 50 Hz is to be converted into a fifth color difference signal UV100 having twice the field repetition frequency, 100 Hz. The line a) in FIG. 4 symbolizes the sequence of fields TA, TB, TC and TD in the first color difference signal UV50. The line b in FIG. 4 symbolizes the location and period with respect to time of these fields in the second color difference signal B (at the output 14 of the first field memory 10), the line c) in FIG. 4 symbolizes the corresponding field sequence at the output 16 of the second field memory 11 (C). The line d) in FIG. 4 symbolizes the interpolation between the single fields, the line e) shows an enumeration of 100 Hz fields, periodically recurrent from 1 to 4, because the color difference signals having the period of four of these 100 Hz fields are processed periodically, i.e., periodically with a frame of the first color difference signal UV50. Line d) in FIG. 4 shows that there is no temporal interframe interpolation in the first and the third fields, whereas a time-averaging is performed for the fields 2 and 4 in the case of motion-compensated luminance and low spatial frequencies. In a corresponding manner, the signals from line c) are taken over in the first and the third fields in line d), and the symbols TZA, TAB, TBC symbolize the described averaging or interpolation in the second and fourth fields. The asterisk with the symbol for the third field characterizes a change of the interlaced frame in the switch from the second to the fifth color difference signal.

Figure 5A:
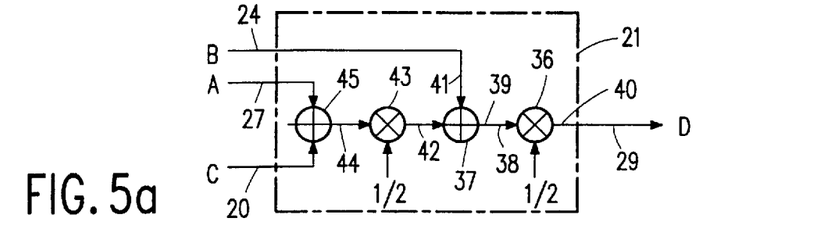
FIGS. 5a–5c show embodiments of a first interpolation circuit.
Figure 5B:
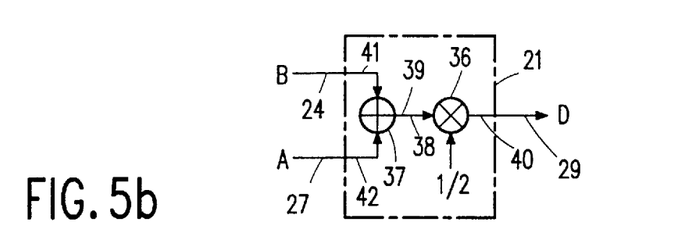
Figure 5C:
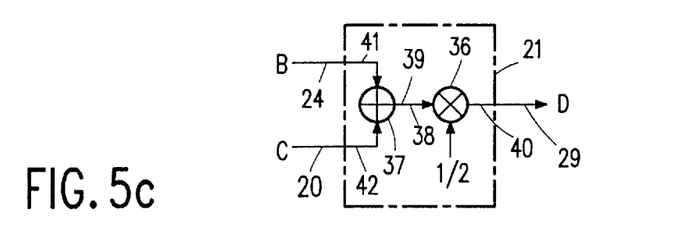

FIGS. 5a–5c show three embodiments of the first interpolation circuit 21. All embodiments FIGS. 5a–5c have a first multiplier stage 36 and a first adder stage 37 in common. The first multiplier stage 36 multiplies a signal applied to its input 38 from the output 39 of the first adder stage 37 by the factor of 0.5 and makes this signal available at its output 40 connected to the output 29 of the first interpolation circuit 21. A first input 41 of the first adder stage 37 constitutes the first input 24 of the first interpolation circuit 21 and comprises the central line B of the three frame lines A, B, C to be processed. A second input 42 of the first adder stage 37 is connected, in the embodiment shown in FIG. 5a, to an output of a second multiplier stage 43 which also multiplies a signal applied to its input 44 by the factor of 0.5. The input 44 of the second multiplier stage 43 is connected to the output of a second adder stage 45 whose inputs are constituted by the second and the third input 20 and 27, respectively, of the first interpolation circuit 21. In the first interpolation circuit 21 shown in FIG. 5a), the mean value of the lines A and C is initially formed, which is then again averaged with the line B. Since the lines A and C originate from the same field, half of each field used for the averaging operation contributes to the third color difference signal D at the output 29 of the first interpolation circuit 21.

In FIG. 5b), the second input 42 of the first adder stage 37 is directly connected to the third input 27 of the first interpolation circuit 21, and in FIG. 5c) this second input 42 is directly connected to the second input 20 of the first interpolation circuit 21. Consequently, in the embodiment shown in FIG. 5b), only the line A and in the embodiment shown in FIG. 5c), only the line C is used for time-averaging. From the group of the spatially adjacent three lines A, B, C in the picture, only the spatially central line, B, from one of the two fields is averaged with at least one of the spatially upper or lower lines, A, C, of the other field.

Figure 6:
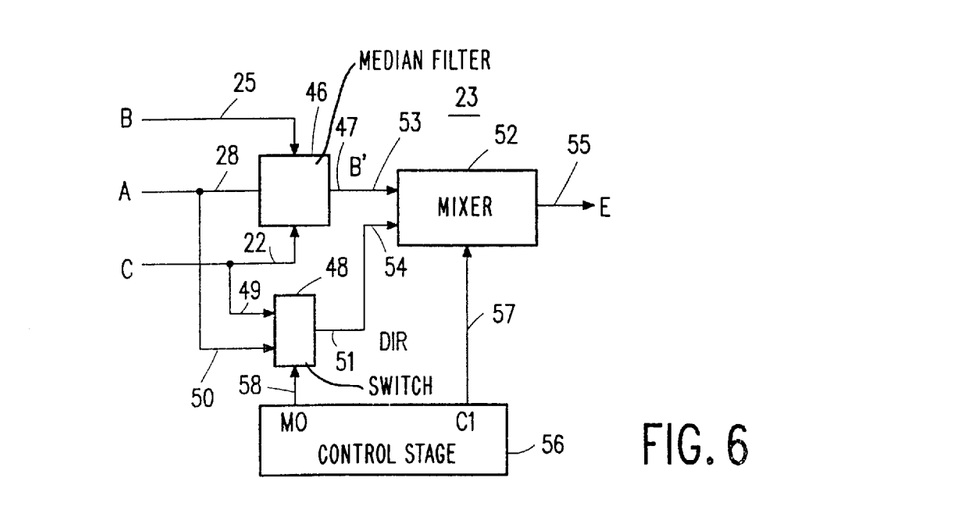
FIG. 6 shows a first embodiment of a second interpolation circuit.

FIG. 6 shows a first embodiment of the second interpolation circuit 23. This second interpolation circuit 23, in which a pixel-by-pixel median filtering is performed of the second color difference signal of the three picture lines A, B, C of two consecutive fields, which lines are locally adjacent in the representation of the picture, to form the fourth color difference signal E, comprises a median filter 46 having three inputs which are constituted by the inputs 22; 25 and 28 of the second interpolation circuit 23 and which is adapted to supply, from its output 47, the central signal value of the three signal values C, B and A currently applied to its inputs 22, 25, 28. In contrast to the above-mentioned spatially central arrangement, the median filter determines, as a central signal value, and independently of the spatial position of the three pixels compared at each instant, always that pixel whose signal value is the central signal value, i.e. a value smaller than the largest and larger than the smallest of the three applied signal values. This signal value is denoted by B' in FIG. 6. While B represents the spatially central line of the three applied lines of the two fields which have just been processed, the signal value B' may also be spatially situated at the edge of the lines considered.

The second interpolation circuit 23 shown in FIG. 6 also comprises a first switching stage 48 having inputs 49, 50 connected to the first input 22 and the third input 28, respectively, of the second interpolation circuit 23. The switching stage 48 can supply a signal DIR at its output 51. This is the signal value of that line of the second field to be processed at the respective instant which is spatially most proximate to the line to be interpolated. The first switching stage 48 thus optionally switches the line A or the line C as signal DIR at its output 51.

The second interpolation circuit 23 in FIG. 6 also comprises a second mixer stage 52 having a first input 53 which is connected to the output 47 of the median filter 46 and a second input 54 which is connected to the output 51 of the first switching stage 48, while the fourth color difference signal E can be taken from its output 55. As far as function and construction are concerned, the second mixer stage 52 corresponds to the first mixer stage 31.

The second interpolation circuit 23 shown in FIG. 6 also comprises a second control stage 56 adapted to control the second mixer stage 52 by determining the coefficients for forming the fourth color difference signal E, i.e. the weighting factor C1. It is applied from the second control stage 56 via a control line 57 to the second mixer stage 52. The second control stage 56 also generates a switching signal MO at a further control line 58, which switching signal is used in the switching stage 48 for optionally switching one of the two inputs 49, 50 to the output 51.

Figure 7:
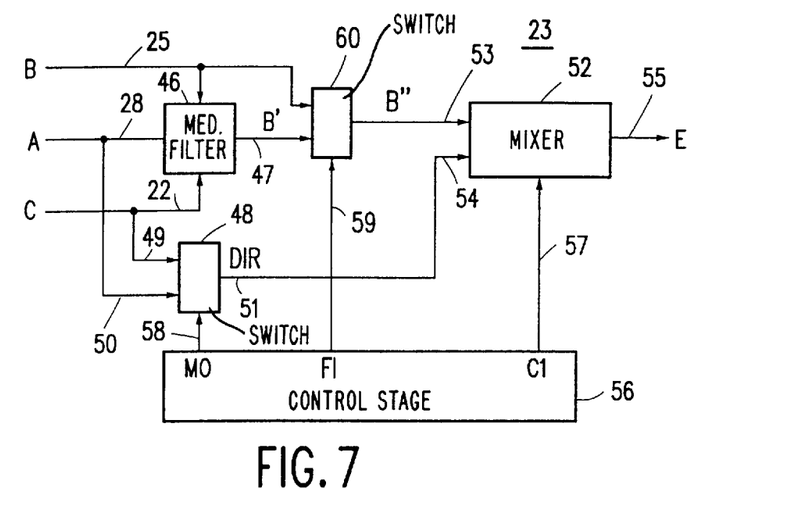
FIG. 7 shows a second embodiment of the second interpolation circuit.

FIG. 7 shows a modification of the second interpolation circuit 23 of FIG. 6, in which, in contrast thereto, a second switching stage 60 controlled also by the second control stage 56 via a third control circuit 59 is adapted for optionally switching the second color difference signal B from the output of the first field memory 10 or from the second input 25 of the second interpolation circuit 23, or the signal B' from the output 47 of the median filter 46 to the first input 53 of the second mixer stage 52. The signal applied from the second switching stage 60 to the first input 53 of the second mixer stage 52 is now denoted as B", while the switching signal at the third control line 59 is denoted by the reference FI. If the two fields originate from the same motion phase, for example, when displaying a cinematographic film, the second switching stage 60 is used for directly switching the signal B, so that the median filtering can be dispensed with in this case.

Figure 8:
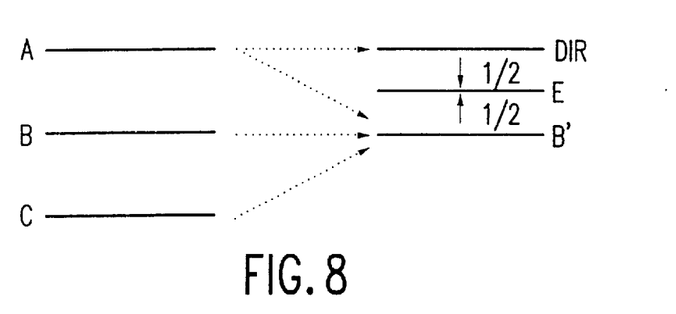
FIG. 8 shows diagrammatically an example of interlaced interpolation by the second interpolation circuit.

A line of the fourth color difference signal E may now be located independently of the vertical zoom factor or of the vertical frame format factor at an arbitrary vertical position between the lines A and C. FIG. 8 shows an example in which the output line (of the fourth color difference signal) E is arranged centrally between the lines A and B. To this end, a generator denoted by the reference numeral 61 in FIG. 3, for generating a vertical control sequence determines that line A and C of the second field from the output 16 of the second field memory 11 which is located most proximate to the line to be interpolated. This line is then applied as signal value DIR directly to the second input 54 of the second mixer stage 52 via the first switching stage 48. Moreover, the generator 61 determines the weighting factor C1 for the signal value B' of that line which results from the median filtering and is to be used as the central line. A linear weighting or linear combination with the weighting factor C1 in the sense of an exact geometrical interpolation is then realized between the signal values DIR and B'. In the relevant example, the weighting factor C1 has the value of 0.5 so that DIR and B' contribute to the same extent to the formation of the signal value E of the fourth color difference signal.

Figure 9:
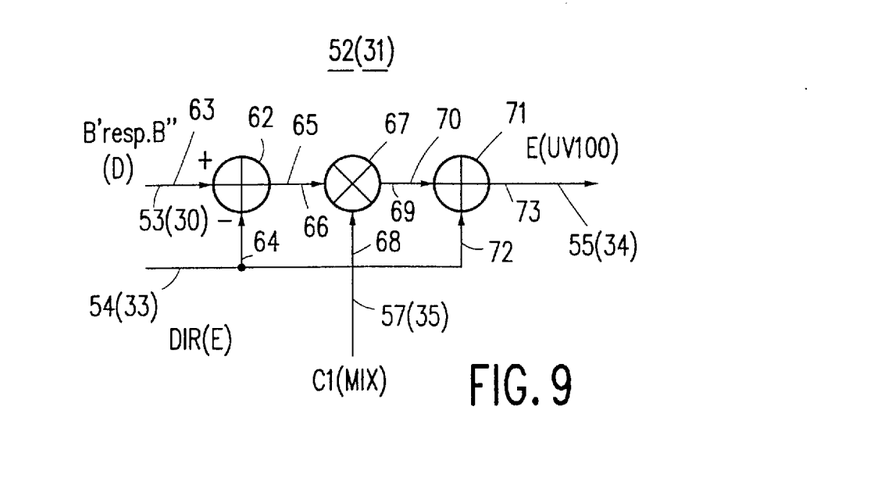
FIG. 9 shows an embodiment of a first mixer stage.

FIG. 9 shows an embodiment of the second mixer stage 52 which is identical to the first mixer stage 31. For the sake of simplicity, the reference signs used in the first mixer stage 31 are added between brackets in FIG. 9. The second (first) mixer stage 52 (31) has a second subtracter stage 62 whose minuend input 63 is connected to the first input 53 (30) of the second (first) mixer stage 52 (31) and whose subtrahend input 64 is connected to the second input 54 (33) of the second (first) mixer stage 52 (31). The difference between the signals B' and B" (D) and DIR(E) is supplied at the output 65 of the second subtracter stage 62 and applied to a first input 66 of a third multiplier stage 67. A second input 68 of the third multiplier stage 67, which is connected to the control line 57 (the coefficient signal input 35) for the weighting factor C1 (the mixing factor MIX) of the second (first) mixer stage 52 (31), receives the weighting factor C1 (the mixing factor MIX) for multiplication by the signal at the first input 66 of the third multiplier stage 67. The product, supplied at the output 69 of the third multiplier stage 67, is applied to a first input 70 of a fourth adder stage 71 whose second input 72 connected to the subtrahend input 64 of the second subtracter stage 62 receives the signal DIR(E). The fourth (fifth) color difference signal E (UV100) can be taken from the output 73 of the fourth adder stage 71 which is connected to the output 55 (34) of the second (first) mixer stage 52 (31). The mixer stages according to FIG. 9 are designed in such a way that the factors C1 and MIX are applied at a scaling factor of 1.

In accordance with the foregoing description, FIG. 3 has a control connection 74 between the generator 61 and the second interpolation circuit 23, via which connection the weighting factor C1, the switching signal MO and possibly also the switching signal F1 from the generator 61 can be applied to the second interpolation circuit 23. Consequently, the generator 61 in FIG. 3 fully or partly takes over the function of the second control stage 56 in FIG. 6 or 7, while the control connection 74 combines the control lines 57, 58 and possibly 59.

FIG. 3 also shows a memory control unit 75 having control lines 76, 77 and 78 which are connected to the first field memory 10, the second field memory 11 and the field memory 12, respectively. Via these control lines 76, 77, 78, the memory control unit 75 controls the writing and reading of the color difference signals into said memories in known manner, under the control of control and clock signals originating from the generator 61 and derived from the transmission of the picture. To this end, the generator 61 is connected to the memory control unit 75 by means of a (seventh) control line 79.

In the case of a vertical zoom, i.e. a vertical frame format change, more lines than have been written with the second color difference signal A, B or C are supplied in the fifth color difference signal UV100 (and also in the fourth color difference signal E). This means that, under circumstances, the same line is required twice (or even more times) at the output 26 of the line memory 12 and that the writing processes in the memories should consequently be stopped periodically. The generator 61 therefore also generates a signal WEN for enabling the writing process and passes on this signal via an (eighth) control line 80 to the memory control unit 75. The special construction of the field memories 10, 11 and the line memory 12 should be adapted to the control of these memories, as the case may be. For example, if the read address in a memory cannot be reset to the start of a line, the associated read counter should be stopped. In this case, the output signal of the picture memory or the field memory 10, 11 should not be used for the processing operation. The signals WEN, MO and C1 are advantageously generated from a Table filed in a corresponding memory arrangement in the generator 61, dependent on a field counter 81 and a line counter 82. In FIG. 3, the field counter 81 and the line counter 82 are shown symbolically and connected to the generator 61 via a line 83. Generator 61, field counter 81 and line counter 82 constitute a unit denoted by the reference numeral 84 in FIG. 3.

Figure 10:
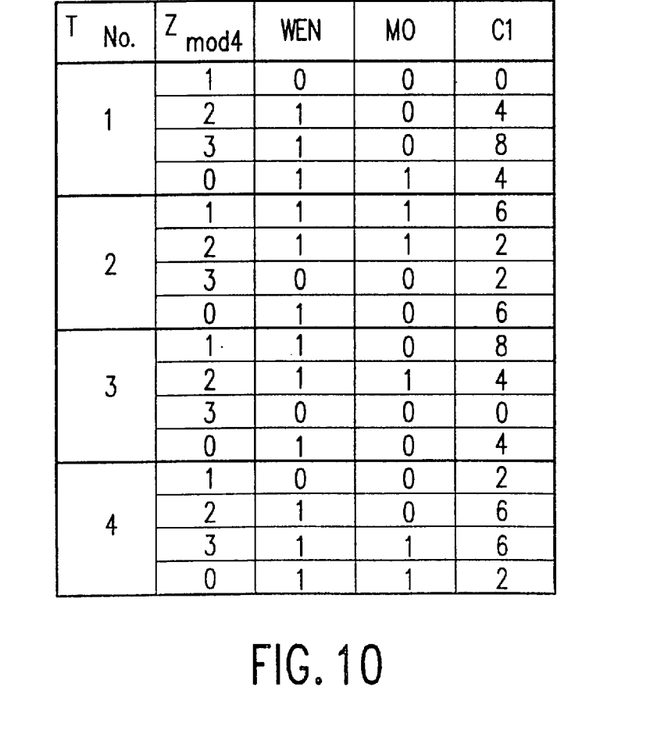
FIG. 10 shows a Table for symbolically representing several signals of the circuit arrangement of FIG. 3 for the case where the picture format factor (zoom factor) assumes the value of 4/3.
Figure 11:
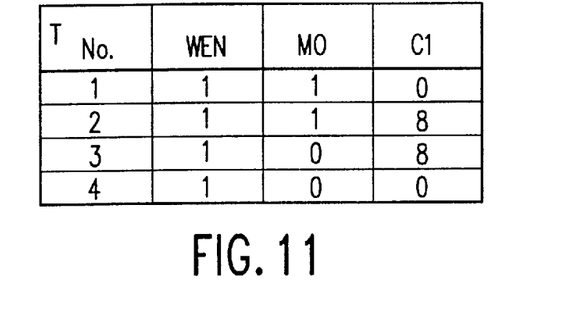
FIG. 11 shows a table for the same signals as in FIG. 10, but now for a zoom factor of 1.

FIGS. 10 and 11 show examples of such Tables, namely for a vertical frame format factor of 4/3 in FIG. 10 and for a frame format factor of 1, i.e. for an unchanged frame size in FIG. 11. In these Tables shown in FIGS. 10 and 11, the reference T denotes the field number and the reference Z denotes the line number, the latter being shown in a modulo-4 representation. In contrast to the previous embodiments, the weighting factor C1 does not have a scaling factor of 1 but of 8 in the Tables shown in FIGS. 10 and 11.

Figure 12A:
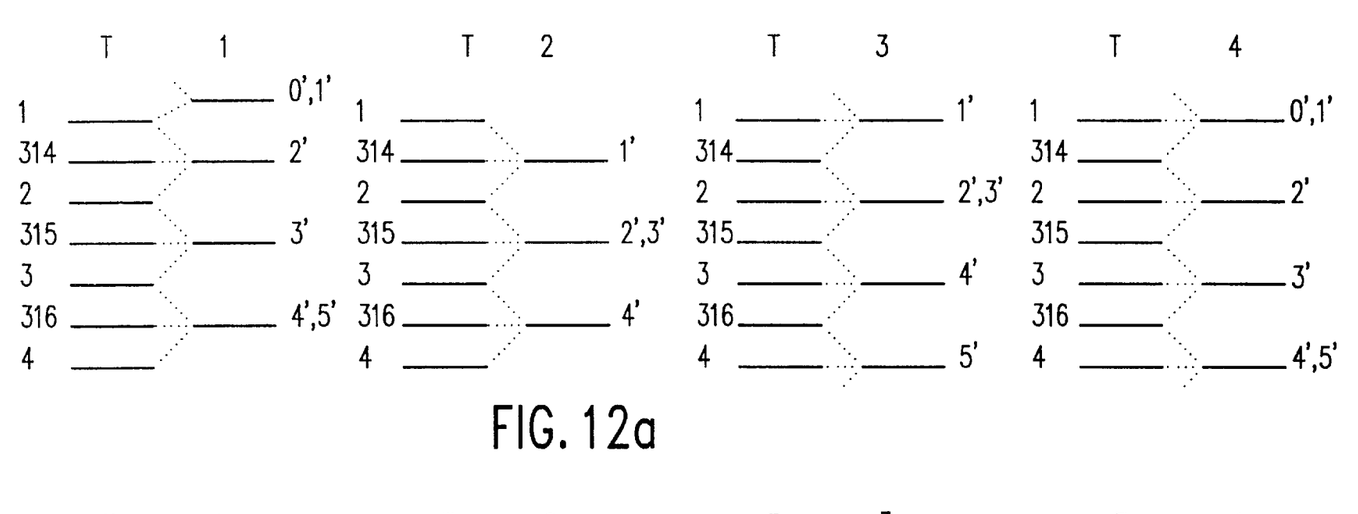
FIGS. 12a and 12b show interpolation diagrams for the first and the second interpolation circuit at a vertical zoom factor of 4/3.
Figure 12B:
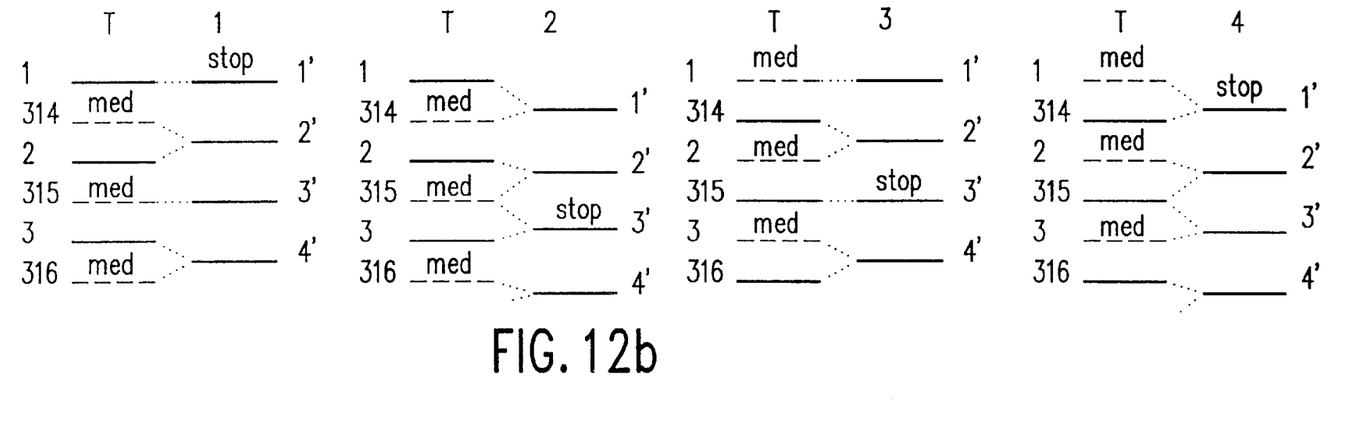

After the signal processing steps described hereinbefore, a line of the time-averaged, third color difference signal D and the spatially high-resolution, fourth color difference signal E are available at each instant for further processing. FIG. 12 shows, for the two interpolation circuits 21 and 23, the field-dependent interpolation diagrams for the case where the vertical frame format factor has the value of 4/3. FIG. 12a) shows the interpolation diagram of the first interpolation circuit 21, FIG. 12b) shows the interpolation diagram of the second interpolation circuit 23. For each interpolation circuit, the interpolation diagrams of the four fields T are shown with the field numbers 1 to 4. In each of these sub-diagrams, the left-hand halves show the lines of the second color difference signal available for time averaging or resulting from median filtering. The right-hand part of each sub-diagram of FIGS. 12a) and b) show the interpolated lines, including the vertical frame format change and interlaced frame changes to be performed for the fifth color difference signal UV100. In a corresponding manner, the left-hand side of each sub-diagram shows the line enumeration in accordance with the continuous frame line enumeration, whereas the right-hand side shows the line enumeration of the interpolated lines, with the addition of an apostrophe. In comparison with the lines c) and d) of the Table in FIG. 4, the left-hand sides of the sub-diagrams of FIG. 12 successively show the fields TA, once more TA, TB and once more TB, whereas the right-hand sides of the sub-diagrams of FIG. 12 show the interpolated fields TA, TAB, TB* and TBC.

Figure 13:
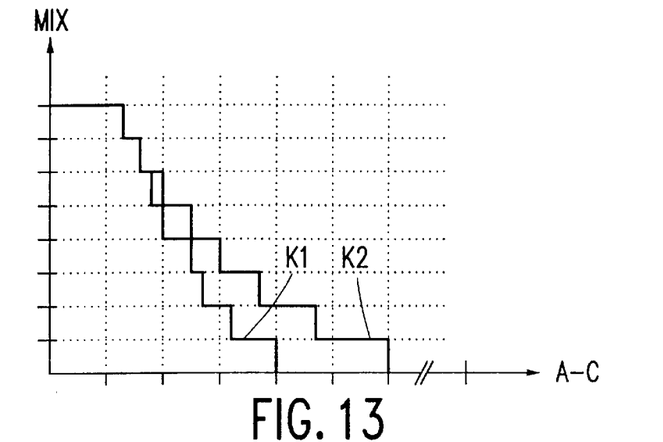
FIG. 13 shows two examples of the variation of the first assignment function.
Figure 14:
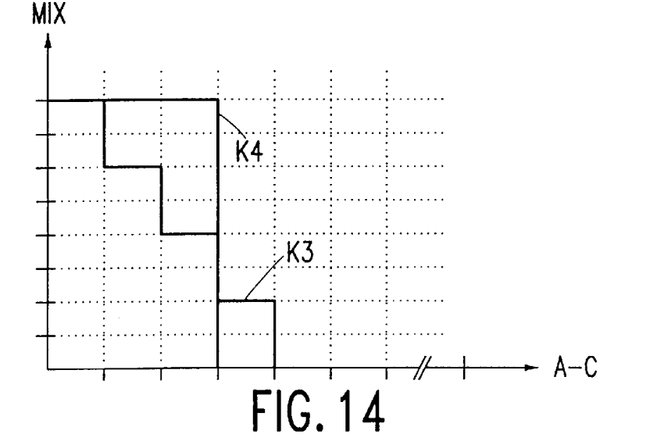
FIG. 14 shows two further examples of the variation of the first assignment function.

The switch between the signals or their mixing or their linear combination shown in FIG. 12a), on the one hand, and b), on the other hand, at the right-hand sides of the sub-diagrams is realized in accordance with the mixing factor MIX in the first mixer stage 31. FIG. 3 shows, by way of example, an embodiment of a first control stage 85 comprising a first subtracter stage 86, a value-forming stage 87, a first characteristic-curve stage 88 and, in the present case, also a third switching stage 89. The first subtracter stage 86 has a subtrahend input 90 connected to the input 19 of the line memory 12, a minuend input 91 connected to the output 26 of the line memory 12 and a difference output 92. The value-forming stage 87 is connected to the difference output 92 of the first subtracter stage 86, which value-forming stage is also connected to the first characteristic-curve stage 88. In the first subtracter stage 86, the signals A and C are subtracted and applied to the value-forming stage 87. The value of said difference then appears as an input signal at the first characteristic-curve stage and addresses a first assignment function stored therein, so that for each value of the amount of the difference between the signals A and C in accordance with this first assignment function or with a characteristic curve formed thereby, an assigned value of a coefficient signal is supplied from the output 93 of the first characteristic-curve stage 88. This coefficient signal constitutes the mixing factor MIX which is applied to the coefficient signal input 35 of the first mixer stage 31. The subtraction between the signals A and C is used for estimating the vertical spatial frequency of the picture contents of the transmitted color difference signals. The variation of the first assignment function, also referred to as switching characteristic curve, may be adapted from the fifth color difference signal UV100 in accordance with the subjective picture impression. To this end, some examples K1, K2, K3 and K4 for possible variations of the first assignment functions are shown in FIGS. 13 and 14. The ordinates in FIGS. 13 and 14 show the values of the mixing factor MIX, while the value of the difference between the signals A and C is plotted on the abscissas. Characteristic curves which are optimal for the picture impression are the examples K1 and K2 in FIG. 13, whereas K3 in FIG. 14 represents a simplified characteristic curve which can be generated with a low number of components. For the purpose of comparison, K4 represents a "hard" switching threshold as the first assignment function.

Figure 15:
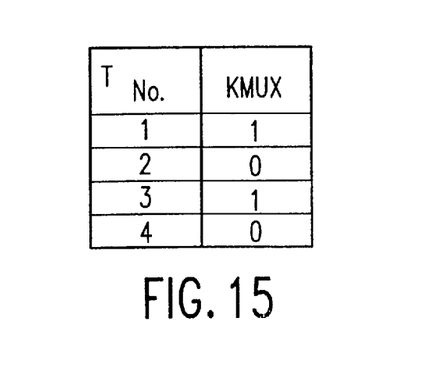
FIG. 15 shows a table diagrammatically representing the control of the third switching stage in the embodiment of FIG. 3.

The switching or mixing or linear combinations of the signals D and E is preferably to be used in fields having a temporal interframe interpolation; however, in the example shown such a temporal interframe interpolation does not take place in the fields 1 and 3. To exclude possible detrimental influences of the time-averaging for these fields, the first control stage 85 or its effect on the switching process in the first mixer stage 31 can be switched off during these fields. The third switching stage 89 is used for this purpose, which stage is also controlled from the generator via a ninth control line 94 in conformity with the compensation delays, particularly by the field counter 81. In said example, a connection is established between the output 93 of the first characteristic-curve stage 88 and the coefficient signal input 35 of the first mixer stage 31 via the third switching stage 89 during the fields 2 and 4, i.e. during temporal interframe interpolation, so that the coefficient signal (mixing factor) MIX is available in an unchanged form. However, during the fields 1 and 3 the third switching stage 89 interrupts this connection, and instead, a fixed value (0) is applied as a mixing factor MIX to the first mixer stage 31 from a corresponding input 95 of the third switching stage 89. The signal at the ninth control line 94 is denoted as KMUX in FIG. 3 and shown in a Table in FIG. 15 for the described example. In the case of a transmission at, for example 25 motion phases per second, i.e. transmission of a cinematographic film, the values for the signal KMUX should be adapted to the corresponding processing of the luminance signal.

Figure 16:
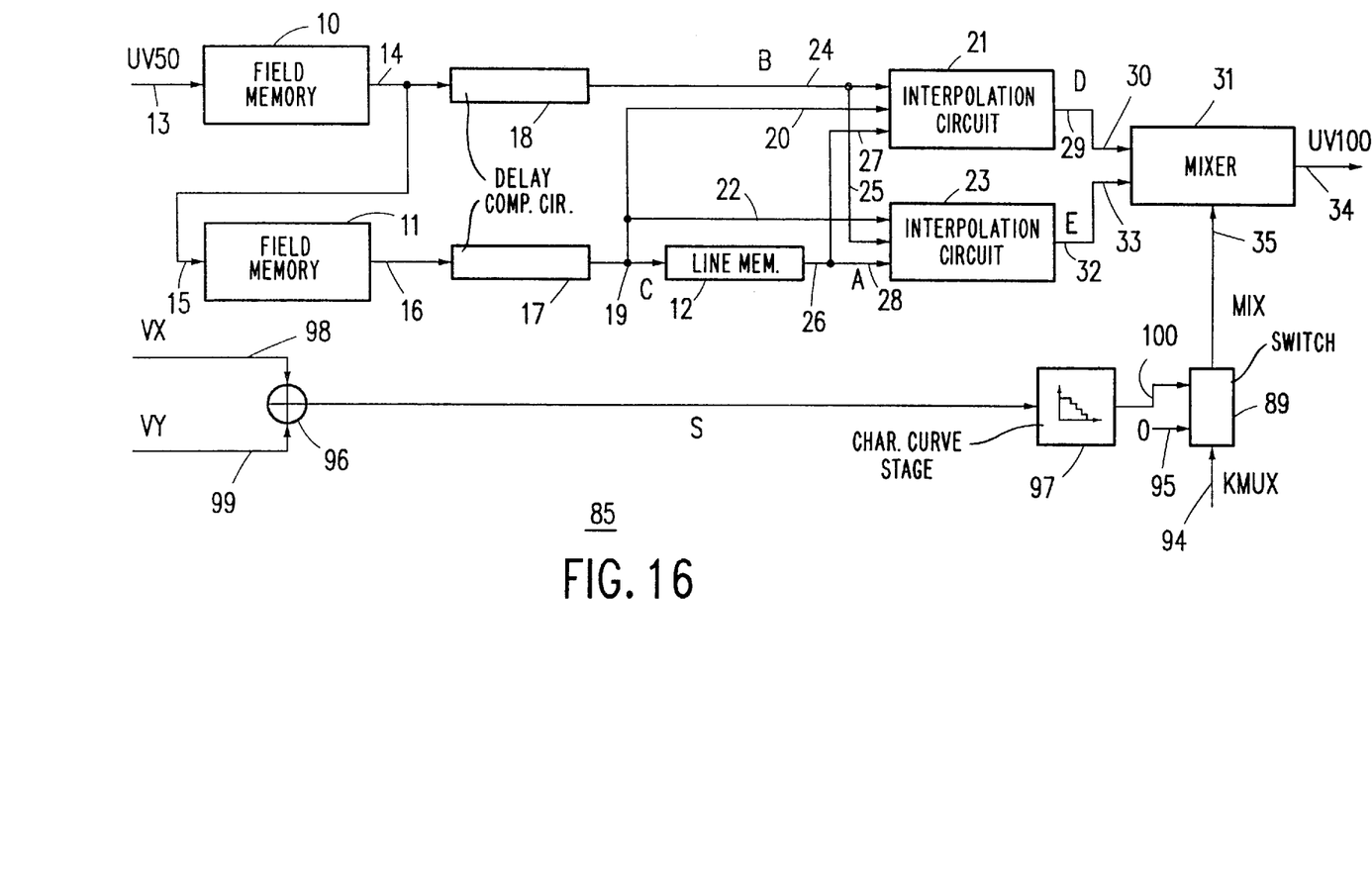
FIG. 16 is a block diagram of a circuit arrangement for performing a second variant of the method according to the invention, which is also applicable to FIGS. 4–12 and 15.

FIG. 16 shows a modification of the circuit arrangement of FIG. 3 for performing a variant of the method according to the invention, in a simplified representation and with identical reference signs for the circuit components already described. As compared with FIG. 3, the structure of the first control stage 85 in the circuit arrangement of FIG. 16 is different because it now comprises a third adder stage 96 and a second characteristic-curve stage 97. The first input 98 of the third adder stage 96 receives a signal VX at the value of the horizontal object motion, and a second input 99 receives a signal VY at the value of the vertical object motion. The sum of these signals constitutes a control value S which is used as an input signal for the second characteristic-curve stage 97 and addresses values of a second assignment function therein, in accordance with which values the output 100 of the second characteristic-curve stage supplies the coefficient signal MIX and, likewise as in the circuit arrangement of FIG. 3, is applied to the coefficient signal input 35 of the first mixer stage 31 via the third switching stage 89. The connection between the output of the third adder stage 96 and the input of the second characteristic-curve stage 97 is denoted by the reference numeral 101. The signals VX and VY are supplied by a signal-processing stage (not shown), by which the motion-compensated luminance signal is generated.

Figure 17:
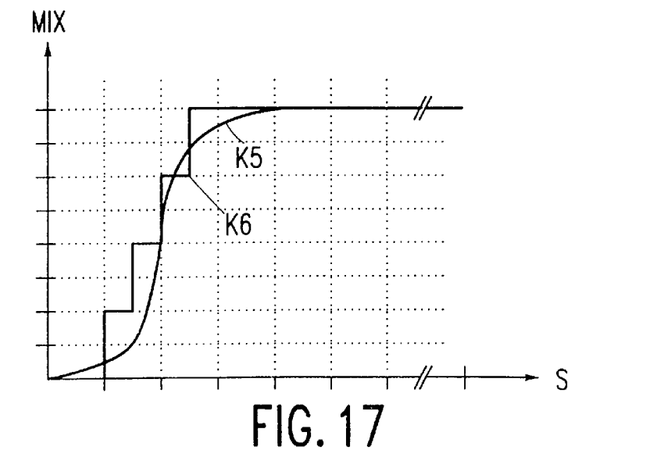
FIG. 17 shows two examples of the variation of the second assignment function.

FIG. 17 shows two examples K5 and K6 for the implementation of the characteristic curves, i.e. the second assignment function, in the second characteristic-curve stage 97, as a mixing factor MIX over the sum of the signals VX and VY functioning as a control value S. While the characteristic-curve example K5 has a steady, ideal variation, K6 shows a simplified, step-shaped variation for reducing the number of components for the second characteristic-curve stage 97.

The inventive method for an improved interpolation of color difference signals upon motion compensation of luminance signals is particularly suitable for use in the conversion of television signals from the 50 Hz frame to a representation at a field repetition frequency of 100 Hz, or in a conversion from 60 Hz to 120 Hz. By adaptation to the vertical spatial frequency or the local motion, a switch is made between two filters performing an optimum chrominance interpolation. The method is particularly advantageous in connection with techniques for vertical scanning rate conversion because an interpolation in the frame, i.e. at the maximally attainable resolution, is realized at higher vertical spatial frequencies or static picture contents. One of the circuit arrangements described may advantageously be used for performing the method according to the invention in an apparatus for processing and/or displaying a picture signal comprising color difference signals.

I claim:

1. A method of interpolating interlaced color difference signals, characterized by the steps of:

generating a second color difference signal from a first color difference signal supplied at a first field repetition frequency by way of field repetition, the second color difference signal having a second field repetition frequency which is doubled with respect to the first field repetition frequency, generating a third, time-averaged color difference signal from the second color difference signal by time-averaging of two consecutive fields, generating a fourth, spatially high-resolution color difference signal by a spatially high-resolution interpolation of two consecutive fields from the second color difference signal, forming a fifth color difference signal to be supplied as a linear combination of the third and the fourth color difference signals by means of coefficients which are complementary with respect to a constant, and determining, in accordance with a vertical spatial frequency, which can be derived from picture contents representable by the color difference signals, or in accordance with a local rate of motion, the coefficients in such a way that substantially the third color difference signal, and in the reverse case substantially the fourth color difference signal, are used for forming the fifth color difference signal in the linear combination in the case of rapid motion or low spatial frequencies.

2. A method as claimed in claim 1, characterized by performing a pixel-by-pixel superimposition of the second color difference signal of two or three picture lines of two consecutive fields, which lines are locally adjacent in the representation of the picture, at the same weighting for each field, to form the third color difference signal.

3. A method as claimed in claim 1, characterized by performing a pixel-by-pixel median filtering of the second color difference signal of three picture lines of two consecutive fields, which lines are locally adjacent in the representation of the picture, to form the fourth color difference signal.

4. A method as claimed in claim 3, characterized in that a signal, which is obtained from the median filtering operation for gaining the fourth color difference signal, is linearly combined with the signal of optionally one of the two picture lines taken from the same field, while the weighting in said linear combination is determined by a picture format factor in dependence upon the picture lines and the fields, in accordance with which factor a vertical format conversion between the pictures representing the first and the fourth color difference signal is to be performed.

5. A method as claimed in claim 4, characterized in that the signal obtained from the median filtering operation, or, optionally if the two fields originate from the same motion phase, the signal of the central picture line of the three picture lines which are locally adjacent in the representation of the picture, is used for gaining the fourth color difference signal.

6. A method as claimed in claim 1, characterized in that, for estimating the vertical spatial frequency, the absolute value of two adjacent picture lines of a field is determined pixel by pixel, and in that the values of the coefficients, which are used for forming the fifth color difference signal from the third and the fourth color difference signal, are fixed from this absolute value via a predeterminable first assignment function.

7. A method as claimed in claim 1, characterized in that the values of the coefficients, which are used for forming the fifth color difference signal from the third and the fourth color difference signal, are fixed from the local rate of motion via a predeterminable second assignment function.

8. A circuit arrangement for interpolating interlaced color difference signals, characterized in that said circuit arrangement comprises:

a first field memory having an input for receiving a first color difference signal and an output for supplying a second color difference signal;

a second field memory having an input connected to the output of the first field memory, and an output for supplying the second color difference signal delayed by one field period;

a line memory having an input connected to the output of the second field memory, and an output for supplying the second color difference signal which is delayed by one field period and an extra line period;

a first interpolation circuit having three inputs connected to the outputs of the first field memory, the second field memory and the line memory, respectively, and an output for supplying a third color difference signal;

a second interpolation circuit having three inputs connected to the outputs of the second field memory, the first field memory and the line memory, respectively, and an output for supplying a fourth color difference signal;

a first mixer stage having a first input connected to the output of the first interpolation circuit, a second input connected to the output of the second interpolation circuit, and an output for supplying a fifth color difference signal; and a first control stage for controlling the first mixer stage by determining a coefficient for forming the fifth color difference signal and for supplying a corresponding coefficient signal.

9. A circuit arrangement as claimed in claim 8, characterized in that the first interpolation circuit comprises:

a first multiplier stage for multiplying a signal applied to its input by a factor of 0.5 and making said signal available at the output of the first interpolation circuit, a first adder stage having an output which is connected to the input of the first multiplier stage, and a first input which constitutes the first input of the first interpolation circuit, and a second input to which the second color difference signal from the second or the third input of the first interpolation circuit, or a mean value of said two signals, can be applied.

10. A circuit arrangement as claimed in claim 8, characterized in that the second interpolation circuit comprises:

a median filter having inputs constituted by the inputs of the second interpolation circuit and being adapted to supply, from its outputs, the central signal value of the three signal values currently applied to its inputs, a first switching stage for optionally switching the second color difference signal from the output of the line memory or from the output of the second field memory to an output of the first switching stage, a second mixer stage having a first input which is connected to the output of the median filter, and a second input which is connected to the output of the first switching stage, and an output from which the fourth color difference signal can be supplied, and a second control stage for controlling the second mixer stage by determining the coefficients for forming the fourth color difference signal.

11. A circuit arrangement as claimed in claim 10, further characterized by a second switching stage controlled by the second control stage for optionally switching the second color difference signal from the output of the first field memory, or the signal from the output of the median filter, to the first input of the second mixer stage.

12. A circuit arrangement as claimed in claim 8, characterized in that the first control stage comprises:

a first subtracter stage having a subtrahend input which is connected to the input of the line memory, a minuend input which is connected to the output of the line memory, and a difference output, a value-forming stage which is connected to the difference output of the first subtracter stage for making the value of the signal available at the difference output of the first subtracter stage, and a first characteristic-curve stage for generating the coefficient signal from said value in accordance with the first assignment function.

13. A circuit arrangement as claimed in claim 8, characterized in that the first control stage comprises:

a third adder stage for combining a signal by the value of a horizontal, local object motion with a signal by the value of a vertical, local object motion, and a second characteristic-curve stage for generating the coefficient signal from said value in accordance with the second assignment function.

14. A circuit arrangement as claimed in claim 12, characterized by a third switching stage for optionally supplying the coefficient signal from the first control stage, or for switching the first mixer stage to an operating state in which the fifth color difference signal corresponds to the fourth color difference signal.

* * * * *